INVENTOR.
ARNOLD E. SAUNDERS
BY
Olen E. Bee
ATTORNEY

Patented Aug. 11, 1953

2,648,752

UNITED STATES PATENT OFFICE 2,648,752

TRANSPARENT ELECTROCONDUCTIVE ARTICLE

Arnold E. Saunders, Jefferson Township, Butler County, Pa., assignor to Pittsburgh Plate Glass Company, Allegheny County, Pa., a corporation of Pennsylvania Application October 27, 1950, Serial No. 192,521

2 Claims. (Cl. 219—19)

This invention relates to improved ceramic or refractory bodies, particularly to transparent ceramic or refractory articles such as windshields or other similar structures, having electroconductive transparent coatings deposited thereon. More particularly, it relates to articles of this character having laterally spaced electro-conductive strips or bus bars in electrical contact with the film and adapted to facilitate passage of electric current through the coating.

It is known that transparent electroconductive films may be deposited upon glass by applying stannic chloride to the surface of glass heated above 400° F., preferably 850° to 1350° F. These films or coatings are obtained by spraying plate, window or other glass while it is heated to a temperature of above 400° F., but below the temperature at which the glass becomes molten, with tin tetrachloride or other tin salts in aqueous solution or in vapor state, in the presence of a reducing agent such as methanol, phenyl hydrazine hydrochloride, or other agents. The films thus obtained are of unknown composition, but appear to contain a preponderant amount, of the order of 97 to 99%, of a tin oxide and certain impurities which may include metallic tin, carbon, silicon, sodium and chlorine and other impurities, depending upon the composition of the applied tin containing solution. These films have a thickness of about 50 to 800 millimicrons, are transparent and have the unusual characteristic of being electroconductive, the particular degree of electroconductivity being dependent, to a large degree, upon the nature of the process of depositing the films. These oxide films have a resistance below about 500 ohms per unit square and a specific resistance below about 0.002 ohm centimeters. Further details respecting the production of these films will be supplied hereinafter. Although articles having such films are useful in many fields, they have been found to be especially useful as windshields or viewing closures in automobiles, aircraft, trains and similar automotive vehicles. In such use the coating is placed in series with a source of electric potential and is used as a heating element in order to heat the closure and prevent deposition of ice, fog, etc. thereupon.

A glass sheet, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. For example, in an essentially rectangular viewing closure such as a windshield, two bus bars are applied on a pair of opposite marginal edges. These metallized strips must be capable of withstanding the temperatures and oxidizing conditions of treatment and, therefore, preferably should be of a ceramic character. Furthermore, they should be capable of fusing or otherwise forming an adherent, well-bonded coating to the glass. The strips should adhere firmly to the glass sheet, and should have a conductivity at least 10 to 20 times that of the conductive coating. Generally, the strips are from about 0.05 to 1 inch in width.

In practice, it has been found that the most satisfactory compositions, for use in preparing the bus bars, comprise a highly conductive metal powder (preferably gold or silver), and a vitrifying binder. The ingredients forming the vitrifying binder, for example, litharge, boric acid and silica, are heated to a sufficient temperature, for example 1700° F., to compel them to fuse and form a glass-like mass. This mass is then converted into a frit by grinding, usually in a ball mill. The electroconductive metal, such as silver, is then added to this frit and spraying or screening vehicles are added to the compositions to facilitate their application. Some of the vehicles usually employed are French fat oil, turpentine, water and ethyl alcohol.

In order to avoid production of bus bars which will develop, in use, excessive stresses in the glass, the bus bar preferably should be located on the extreme edge of the glass and the bus bar thickness should not exceed about 0.005 inch and, preferably, should be below about 0.003 inch.

After application of the ceramic metal bus bars to the glass sheet by painting or other method, the sheet is heated to the temperature at which application of the conductive coating may be effected, for example, above about 400 to 800° F. but below the fusion point of the glass, usually 950 to 1150° F. During this heating operation, the ceramic metal coating is fused onto the glass so that a firm bond is established between the glass and the metal coating.

When the glass has been heated as above described, for one or two minutes, it is withdrawn from the heating chamber and immediately is sprayed with the coating solution before substantial cooling of the glass sheet can take place. A quantity of the coating solution containing stannic chloride or like compound is placed in an atomizing spray gun and the heated glass sheet is sprayed with an atomized spray of this material for a brief period, usually of the order of 2 to 20 seconds, depending upon the thickness of film to be produced, the air pressure imposed upon the atomizing spray gun, etc. Usually this spraying operation is conducted in air of atmospheric humidity or oxygen. However, conductive coatings have been obtained even when oxygen appears to be essentially absent, although it is probable that oxygen, either from the atmosphere or combined in water or similar compound, is present. This process results in the production of a base coated with a tin oxide electroconductive film.

Articles produced according to the above description, further details of which will be supplied below, are suitable for use as viewing closures or windows. Usually they are laminated with a suitable plastic such as polyvinyl butyral to reinforce the glass and provide a so-called "safety glass" construction. These closures may be successfully heated by imposing an electric potential across the bus bars, thus using the conductive film as a resistance element.

In the past, an unduly high number of windshields or like panels of the type herein described have failed in use or test. This failure frequently is manifested by fracture of the glass after an electric potential has been imposed across the bus bars to cause the film to be heated to a suitable temperature or above (for example 100 to 125° F.) for a period of time. Such failure has been discovered to be particularly apt to occur in certain panels having a contour such that the bus bars must be disposed in a non-parallel relationship.

A typical illustration is the circular type of closure which is frequently found in marine or aeronautical craft. If two parallel equidistant bus bars were employed in such a unit, it would be impossible to place them in proper position to obtain the benefit of the electroconductive coating over the entire area of the closure. Consequently in this and many other installations, non-parallel bus bars must be employed to secure full coverage of the glass base by an electroconductive film. Such panels show a serious tendency to fracture or fail in test or in use.

It has been found that one of the causes of such failure is unequal distribution of current flow to one or both of the bus bars. This is especially true in the case of uniform resistivity films, upon which unequal distribution of current flow will result in unequal heating. It has been found that substantial reduction in failures may be effected by providing only a designated portion of the base with the electroconductive film.

It will be understood that when a panel is provided with non-parallel bus bars, the current flow throughout the film will tend to be highest at the point or points where the bus bars are closest together, and lowest at the point or points where the bus bars are farthest apart. In like manner, when one bus bar of a pair of bus bars (whether or not parallel) is longer than the other, the density of current flow and consequent heat generation usually tends to be highest in areas of the film adjacent the ends of the shorter bus bar.

Such a concentration of current flow and consequent heat generation also occurs at the termini of the bus bars (whether parallel or not) on panels having rounded corners whereon the bus bars extend up to, just short of, or partially or completely around the corners. The corners of such panels have a radius of at least one-quarter of an inch.

Consequently a large current may flow to a bus bar at one point or area along its length and a relatively lower current may flow to the bus bar at another point or area along its length.

According to this invention, an electroconductive article of the type described above comprising a refractory base having laterally spaced electroconductive bus bars and a transparent electroconductive film of lower electroconductivity than the film and in electrical contact therewith has been provided in which excessive current flow at the termini of the bus bars has been avoided. This may be accomplished by providing the base with an electroconductive film in which portions of the base adjacent a terminus of a bus bar to which an excess of current would ordinarily flow such as described above are left exposed or are of substantially less electroconductivity than that of the film. Such areas have a special contour as hereinafter disclosed.

The exposed areas on the base may be created either by removal of the electroconductive film from the base or by masking the area prior to application of the film thereby preventing formation of the film in this area. These areas need not be wholly nonconductive but may be areas in which the thickness or resistivity of the electroconductive film is controlled, either in application or upon removal.

For example, the entire base may be coated with one layer of the electroconductive film whereas portions of the film other than the desired area may be coated with two or more layers of the film. When the film is removed, for example, by chemical decomposition, sometimes only a portion may be removed thus leaving a thinner film. The conductivity of this thinner film will be less than that of the electroconductive film originally deposited. When recourse to such procedures is had it is usually desired that the electroconductivity of this area be no more than one half to one tenth that of the electroconductive film.

These exposed or uncoated areas are of a contour such that the boundary line or edge of the electroconductive film separating the film from the exposed areas at or near the terminus of the bus bar extends from a point adjacent to the end of the bus bar in a direction substantially perpendicular or normal to the inner edge of the bus bar. Such disposition of the film and exposed area reduces the amount of current flowing to the end of the bus bar thereby substantially eliminating excessive heating of the film in the area adjacent the terminus of the bus bar.

Figure 1:
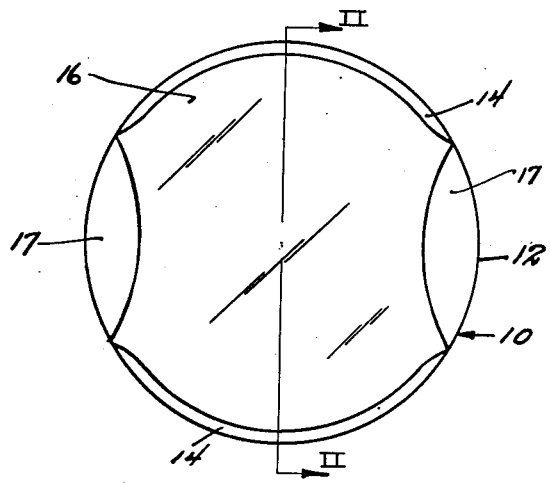
Fig. 1 is a diagrammatic plan view of a circular glass panel embodying the present invention.
Figure 2:
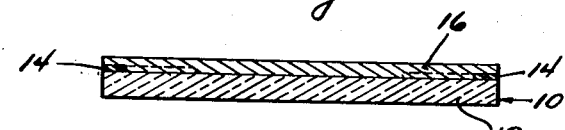
Fig. 2 is a sectional view of the panel of Fig. 1 taken along line II—II.

Referring to Figures 1 and 2, the heating panel 10 therein shown comprises a circular glass base 12 having bus bars or conductive marginal edge strips 14 of an electroconductive metal such as gold, silver, copper, etc. along opposed edges and close to the edges (preferably within 0.5 inch of the edge or on the edge) of the sheet. The bus bars 14 may be connected to opposite poles of a source of potential (not shown).

The panel 10 is provided with an electroconductive transparent film 16, such as may be produced by spraying or otherwise applying a tin compound or similar compound on the heated panel as previously described. The resistance of such film per unit square (surface film resistance) normally is substantially constant. That is, while there may be some variation in the thickness and conductivity of these films, the variation is random and generally speaking (neglecting small areas) unless special precautions are taken the average surface resistance (in ohms per unit square) of areas of the film between one pair of opposed sections will not materially differ from that between another pair of opposed bus bar sections.

When the circuit is closed, electric current passes through the electroconductive transparent film 16 and heat is generated by virtue of the resistance of the film. As stated above, the current passes more readily through the electroconductive coating where the distance between the bus bars is shortest. This would tend to produce an excess of heat at the termini of the bus bars located in this area. In Fig. 1, such areas are disposed adjacent to the termini of the bus bars at the left and right hand edges of the base.

However, in accordance with this invention this area of excessive heating is eliminated by providing areas 17 of lower conductivity at the edges of the panel which areas are either nonconducting or which have conductivity materially less than the film 16. The exposed areas in the panel in Fig. 1 may be roughly in the shape of a semi-circle as illustrated or may be of any other convenient contour so long as they direct current flow between the termini of the bus bars in such manner that the current flow is substantially normal to the bus bars at or near the termini thereof.

The width of the area, as measured from the edge of the base intermediate the bus bars to the edge of the area adjacent the film, increases as the distance between opposed portions of the bus bars increases. This is not necessarily a straight line function nor first-order variation, but may be so.

The edge of the area 17 which is adjacent the film is preferably arcuate and generally terminates at or near the termini of the bus bars at an angle approximating 90° to the inner edge of the bus bar. It is not always necessary that the area 17 be in contact with the ends of the bus bars but it is preferable that the edge of the area 17 which is adjacent the film terminates within a distance from the end of the bus bar which represents at the most five percent of the distance between the termini of the bus bars. Such an embodiment has been found to be especially successful in preventing failures of the film due to excessive heating of the film at or near the termini of the bus bars.

As mentioned above, there are several methods which may be employed in producing the articles which are the subject matter of this invention. One method comprises applying a transparent electroconductive film to the entire surface of the base and then removing the portion of the film not desired. According to one suitable method of removing the coating, the film may be exposed to the action of an acid and a metal more electronegative than the metal of the film itself. Where the coating is principally tin oxide, zinc, cadmium, aluminum or iron would be used in the removal process. This may be carried out very effectively by depositing upon the coated base a film of finely divided or pulverulent electronegative metal and a dispersing agent, such as zinc, and a water dispersible binder which serves as a binding medium to hold the zinc in place. Thereafter the zinc-coated base may be sprayed or otherwise coated with an aqueous solution of an acid such as hydrochloric, sulfuric, oxalic or other mineral or equivalent acid which does not readily etch glass.

A typical solution for applying the zinc or other electronegative metal to the base may be prepared by making a solution containing:

3500 cubic centimeters water
50 cubic centimeters glycerol
10 grams sodium nitrite
5 grams sodium pyrophosphate
25 grams bentonite and mixing this solution in equal parts by volume with methanol. One pound of powdered zinc is then added to each quart of the resulting methanol solution.

The solution thus obtained is then sprayed upon the glass article to deposit a thin zinc-containing film upon the surface thereof. Thereafter the zinc-coated surface is sprayed with an aqueous solution of an acid, such as a dilute aqueous hydrochloric acid having an HCl concentration of 1 to 10 percent by weight of the amount of the acid solution being sufficient to thoroughly wet the zinc-coated surface. Following this operation, the sheet is allowed to stand for a short period of time, about 5 to 10 minutes, and is then washed with water to remove the remaining acid and other coating components. The electroconductivity of the surface which has been exposed to this treatment will then be found to have been destroyed or substantially decreased since the electroconductive coating has been removed or substantially removed.

A further method of producing the article which is the subject of this invention comprises masking the surface of the base prior to the application of the electroconductive film. In giving consideration to the application of a masking compound prior to the application of the electroconductive film to the panel, it must be remembered that the coating process is carried out at temperatures in excess of 800° F. to achieve optimum result. Consequently the various masking tapes cannot be used since they would be destroyed at temperatures well below those encountered in practice.

It has been found that a pulverulent feldspar when applied as a paste or magma to a glass surface will form a very effective mask during the application of the coating solutions commonly employed in producing transparent electroconductive film. The mask is impermeable to the film forming ingredients, is heat resistant, inert with respect to glass at elevated temperatures, and is readily removed from the glass at the conclusion of the application of the electroconductive film.

The chemical analysis of a feldspar which is suitable for use in coating the base where nonconductive areas are desired is as follows:

63–65 parts by weight $SiO_2$
16.5–18 parts by weight $Al_2O_3$
9–11 parts by weight $K_2O$
4–5 parts by weight $Na_2O$
0.5–0.8 parts by weight $Na_2B_4O_7$ The feldspar is preferably ground fine enough to pass a 325 mesh screen and the pulverized compound is then introduced into a liquid medium of which the following is a typical example:

75 parts by weight di-octyl sodium sulfosuccinate
10 parts by weight methanol
5 parts by weight glycerol
10 parts by weight of a 10 percent solution of a sulfonated bicarboxylic acid ester in water.

In the process of applying the electrically conductive film to predetermined portions of the glass panel, those parts which are not to be coated with the electroconductive film are coated with the masking solution in any suitable manner and the liquid medium is evaporated, either at elevated temperatures or at atmospheric temperature. Thereafter the electroconductive film may be applied in the conventional manner. Then the masking compound is removed, leaving the uncoated surface thereby exposed.

Figure 3:
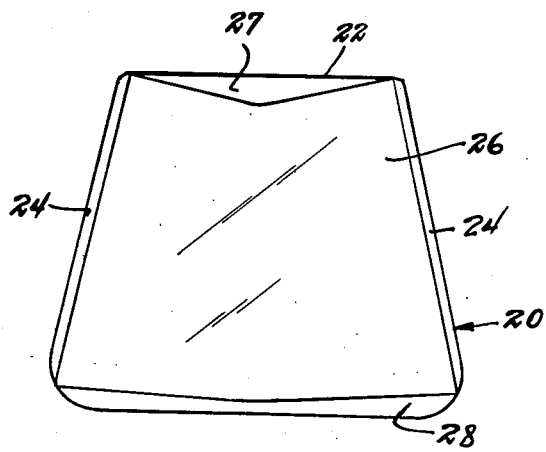
Fig. 3 is a diagrammatic plan view of an irregularly shaped panel illustrating another embodiment of the invention.

Fig. 3 diagrammatically illustrates a further embodiment of the invention. The panel 20 comprises a glass base 22 substantially trapezoidal in form having non-parallel ceramic metal bus bars 24 thereon and a transparent electroconductive film 26. Since the upper termini of the bus bars are closer together than any other opposed portions of the bus bars, there is a natural tendency for more current to pass between the bus bars at these points than elsewhere along the length of the bus bars, thus causing excessively heated areas at these termini. This tendency is overcome in this invention by providing an area 27 which is either uncoated or at all events is of lower conductivity than the film 26. This area 27 is illustrated as being in the shape of a shallow triangle. Two sides of the triangle are formed by extending the boundary lines between the film and the uncoated portion from a point at or near the end of the bus bars at an angle of approximately 90° to the inner edge of the bus bar toward the opposing bus bar and having them intersect somewhere intermediate the bus bars on the base. The point of intersection would depend upon the angle which the inner edge of the bus bar makes with the edge of the base intermediate the bus bars. In the case where these angles are equal the point of intersection is approximately midway between the bus bars. The third side of the triangular area 27 is formed by the edge of the base. Usually the intersection is rounded off in order to prevent a localized current concentration at the intersection.

Such a contour promotes establishment of substantially uniform heat distribution in film 26. However, the shape of the area 27 may vary considerably according to the heat distribution desired.

The bus bars 24 do not extend to the bottom edge of the panel but terminate at the lower rounded corners thereof. In order to prevent formation of excessively hot areas in the film at the lower termini of the bus bars an area 28 of lower electroconductivity than the film 26 is provided intermediate such termini. The boundary line between the electroconductive film 26 and the area 28 of lower conductivity extends from the termini of the bus bars at an angle of approximately 90° to the inner edge of the bus bar and runs substantially parallel to the bottom edge of the panel, positioned inwardly therefrom about an inch or more. The bottom edge of the panel intermediate the lower termini of the bus bars forms a further boundary of the area 28.

Such an embodiment as described above may be employed in panels having a pair of laterally spaced bus bars (whether parallel or not) and rounded corners or corners forming an obtuse angle. In the case of rounded corners one of the bus bars may extend up to the corner, just short thereof or partially or completely around the corner. The terminology in the claims "having its terminus at the rounded corner of the base" or equivalent terms is intended to include the above possibilities. In such cases the boundary line between the electroconductive film and the area of lower conductivity usually extends from a point at or near the terminus of the bus bar at an angle of approximately 90° to the inner edge of the bus bar at the end thereof and runs from the one bus bar toward the other bus bar terminating wherever desirable, depending upon the configuration of the panel.

The invention is particularly applicable for use in connection with a transparent tin oxide film. However, the invention is also applicable in connection with other transparent electroconductive films particularly metal oxide films. Thus the films herein contemplated may comprise cadmium oxide, antimony oxide, cobalt oxide, zinc oxide, indium oxide, titanium oxide, chromium oxide, platinum oxide, silicon oxide, silver oxide, thallium oxide, etc. which may be prepared using bromide, chloride or acetate of the corresponding metal. Transparent metal films normally have relatively poor light transmission but are suitable where this property is not seriously objectionable.

Where viewing closures for vehicles are to be provided, the base for the film normally is ordinary window or lime soda glass. Other refractory materials including borosilicate glass, china, mica, phosphate glass, silicon carbide, tungsten carbide, porcelain, stone or other refractory composition which melts at temperatures above 1150 to 1350° F. may be provided with electroconductive coatings in the same manner.

Although the present invention has been described with reference to the specific details of certain embodiments thereof, it is not intended that such details shall be regarded as limitations upon the scope of the invention except insofar as included in the accompanying claims.

I claim:

1. An article of manufacture which comprises a trapezoidally shaped refractory base having a pair of laterally spaced electroconductive bus bars along the non-parallel edges of the base, a transparent electroconductive film which is less electroconductive than the bus bars and which is in electrical contact therewith and an area intermediate closer opposed termini of the bus bars which is substantially lower in electroconductivity than the film, the boundary line between said film and said area extending from a point adjacent a terminus of the bus bar at an angle of approximately 90° to the inside edge of the bus bar toward the opposing bus bar.

2. An article of manufacture which comprises a refractory base having one corner forming an obtuse angle and having thereon a pair of laterally spaced electroconductive bus bars, one of which extends across the surface of the base having its terminus at the corner forming the obtuse angle, a transparent electroconductive film which is less electroconductive than the bus bars and which is in electrical contact therewith, and an area intermediate the bus bars substantially lower in electroconductivity than the film, the boundary line between said film and said area extending from a point adjacent the terminus of the bus bar at an angle of approximately 90° to the inside edge of the bus bar toward the opposing bus bar.

ARNOLD E. SAUNDERS.

References Cited in the file of this patent

UNITED STATES PATENTS

| Number | Name | Date |
|---|---|---|
| 2,021,661 | Kisfaludy | Nov. 19, 1935 |
| 2,119,680 | Long | June 7, 1938 |
| 2,273,941 | Dorn | Feb. 24, 1942 |
| 2,429,420 | McMaster | Oct. 21, 1947 |
| 2,475,379 | Stong | July 5, 1949 |
| 2,486,148 | Glynn et al. | Oct. 25, 1949 |
| 2,497,507 | McMaster | Feb. 14, 1950 |
| 2,507,036 | McCrumm et al. | May 9, 1950 |
| 2,513,993 | Burton | July 4, 1950 |
| 2,523,566 | Glynn | Sept. 26, 1950 |
| 2,537,671 | Jack et al. | Jan. 9, 1951 |
| 2,552,955 | Gaiser et al. | May 15, 1951 |
| 2,553,974 | Lamb | May 22, 1951 |
| 2,557,983 | Linder | June 26, 1951 |
| 2,614,944 | Lytle | Oct. 21, 1952 |